United States Patent
Kreidler et al.

(10) Patent No.: US 12,117,570 B2
(45) Date of Patent: Oct. 15, 2024

(54) METHOD AND DEVICE FOR DETECTING A DECALIBRATION OF A SENSOR FOR CAPTURING THE SURROUNDINGS OF A VEHICLE

(71) Applicant: MERCEDES-BENZ GROUP AG, Stuttgart (DE)

(72) Inventors: Anna Kreidler, Stuttgart (DE); Sascha Mühlbrandt, Wiernsheim (DE); Florian Eppler, Böblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/681,131

(22) PCT Filed: Jun. 28, 2022

(86) PCT No.: PCT/EP2022/067674
§ 371 (c)(1),
(2) Date: Feb. 5, 2024

(87) PCT Pub. No.: WO2023/011807
PCT Pub. Date: Feb. 9, 2023

(65) Prior Publication Data
US 2024/0264294 A1     Aug. 8, 2024

(30) Foreign Application Priority Data
Aug. 6, 2021 (DE) .................. 10 2021 004 061.9

(51) Int. Cl.
*G01S 7/52* (2006.01)
*B60W 40/02* (2006.01)
*G01S 13/58* (2006.01)

(52) U.S. Cl.
CPC ......... *G01S 7/52004* (2013.01); *B60W 40/02* (2013.01); *G01S 13/589* (2013.01);
(Continued)

(58) Field of Classification Search
CPC .. G01S 7/52004; G01S 13/589; B60W 40/02; B60W 2420/403; B60W 2420/408; B60W 2520/14; B60W 2520/16; B60W 2520/18
See application file for complete search history.

(56) References Cited

U.S. PATENT DOCUMENTS

| | | | |
|---|---|---|---|
| 11,645,782 | B2 | 5/2023 | Steinmeyer et al. |
| 2008/0012752 | A1 | 1/2008 | Okamura et al. |

(Continued)

FOREIGN PATENT DOCUMENTS

| | | |
|---|---|---|
| CN | 111989589 A | 11/2020 |
| CN | 112304356 A | 2/2021 |

(Continued)

OTHER PUBLICATIONS

International Search Report and Written Opinion mailed Oct. 26, 2022 in related/corresponding International Application No. PCT/EP2022/067674.

(Continued)

*Primary Examiner* — Daniel Pihulic
(74) *Attorney, Agent, or Firm* — PATENT PORTFOLIO BUILDERS PLLC

(57) ABSTRACT

A method for detecting a decalibration of a surroundings sensor involves using the surroundings sensor to detect a number of objects in the surroundings. Angular velocities of the detected objects are determined while the vehicle is travelling. Clusters of a number of the objects are determined by a histogram evaluation based on the angular velocities. A decalibration of the surroundings sensor is identified if a cluster is found beyond an angular velocity of zero, which is caused by a deviation of the orientation of the surroundings sensor from a normal position relative to a vehicle axis of the vehicle.

10 Claims, 3 Drawing Sheets

Figure 1:
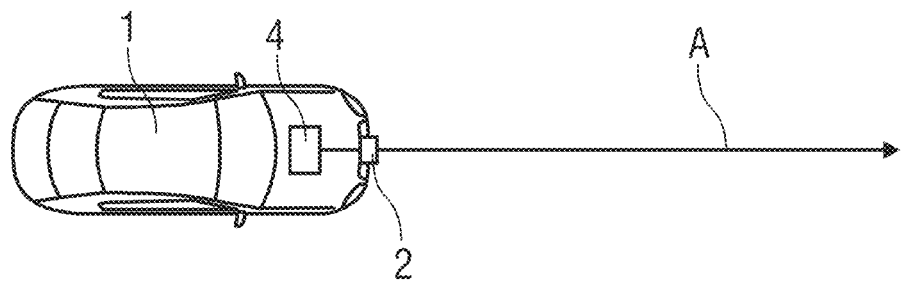

(52) U.S. Cl.
CPC . *B60W 2420/403* (2013.01); *B60W 2420/408* (2024.01); *B60W 2520/14* (2013.01); *B60W 2520/16* (2013.01); *B60W 2520/18* (2013.01)

(56) References Cited

U.S. PATENT DOCUMENTS

| | | | |
|---|---|---|---|
| 2018/0341007 | A1 | 11/2018 | Fetterman et al. |
| 2021/0124033 | A1 | 4/2021 | Ziegler et al. |
| 2021/0149020 | A1 | 5/2021 | Pinnock |

FOREIGN PATENT DOCUMENTS

| | | | | | |
|---|---|---|---|---|---|
| CN | 112710339 | A | | 4/2021 | |
| CN | 117836660 | A | * | 4/2024 | ........... G01S 13/589 |
| DE | 102016225579 | A1 | | 6/2018 | |
| DE | 102019127140 | A1 | | 4/2021 | |
| DE | 102019216399 | A1 | | 4/2021 | |
| DE | 102021000360 | A1 | | 4/2021 | |
| JP | 2020026955 | A | | 2/2020 | |
| KR | 20210081151 | A | | 7/2021 | |
| RU | 2685767 | | | 4/2019 | |
| WO | 2006051603 | A1 | | 5/2006 | |
| WO | 2021194598 | A2 | | 9/2021 | |
| WO | WO-2023011807 | A1 | * | 2/2023 | ........... G01S 13/589 |

OTHER PUBLICATIONS

Office Action created May 23, 2022 in related/corresponding DE Application No. 10 2021 004 061.9.

Office Action dated Jul. 31, 2024 in related/corresponding JP Application No. 2024-506891.

Office Action dated Jul. 27, 2024 in related/corresponding CN Application No. 2022800544304.

* cited by examiner

METHOD AND DEVICE FOR DETECTING A DECALIBRATION OF A SENSOR FOR CAPTURING THE SURROUNDINGS OF A VEHICLE

BACKGROUND AND SUMMARY OF THE INVENTION

Exemplary embodiments of the invention relate to a method for detecting a decalibration of a sensor for capturing the surroundings of a vehicle, to a device for detecting a decalibration of a sensor for capturing the surroundings of a vehicle, and to a vehicle.

The position and/or orientation of surroundings sensors, for example for motor vehicles, can be subjected to sudden changes, which can lead to degradation of the sensor performance. This can lead in particular to incorrect perception data. With regard to highly automated and/or autonomous vehicle systems can lead to an undetected sudden change can lead to unwanted vehicle interventions and/or prevent necessary vehicle interventions.

Detecting sudden changes in the position and/or orientation of a surroundings sensor is therefore desirable.

In the prior art, the orientation of the sensor is determined based on a temporal averaging of the perception data. Algorithmic methods used for this purpose are inherently slow compared to the update rate of the perception data. Due to larger filter constants, in particular a sudden change in the sensor orientation in comparison to the vehicle axis cannot be determined immediately.

DE 10 2021 000 360 A1 describes a device for detecting a decalibration of a camera. Here, an image sensor is attached to a frame by means of at least one suspension means. In addition, at least one electrical capacitor is arranged on the frame, which capacitor is fully charged when the camera is deactivated. An evaluation unit determines a charge of the capacitor when the camera is activated, and furthermore checks whether the determined charge corresponds to an expected value and, on detecting a deviation between the determined charge and the expected value, concludes that the camera has been decalibrated and/or to output relevant information if the deviation is detected.

Exemplary embodiments of the invention are directed to a method and a device for detecting a decalibration of a sensor for capturing the surroundings of a vehicle, and a vehicle.

The invention relates to a method for detecting a decalibration of a sensor for capturing the surroundings of a vehicle.

According to the invention, a plurality of objects in the vehicle surroundings is detected using the surroundings sensor. Angular velocities of the detected objects are determined while the vehicle is travelling, wherein clusters of a number the objects are determined based on the angular velocities by means of a histogram evaluation, wherein it is concluded that there is a decalibration of the surroundings sensor is found beyond an angular velocity of zero, which is caused by a deviation of the orientation of the surroundings sensor from a normal position relative to a vehicle axis of the vehicle.

The present invention enables immediate detection of sudden changes in the position and/or orientation a surroundings sensor. The detection time is only limited by the cycle time of the sensor.

The following advantages result:
shortened detection time of changes in position and/or orientation of a surroundings sensor,
avoidance of safety-relevant incorrect interventions in the vehicle control system, and
increased detection confidence of changes in position and/or orientation of a surroundings sensor.

In one embodiment, one or more from a yaw angle velocity, a pitch angle velocity, and a roll angle velocity is determined as angular velocity and undergoes the histogram evaluation.

In one embodiment, the angular velocities of the detected objects are determined by comparing movement data of the vehicle with data captured by the surroundings sensor or derived therefrom.

In one embodiment, a lidar and/or a radar and/or a camera and/or an ultrasound sensor is or are used as surroundings sensor.

In one embodiment, one or more from the following list are used as movement data of the vehicle: a steering angle, a yaw angle, a roll angle, a pitch angle, a yaw acceleration, a roll acceleration, a pitch acceleration, suspension travel signals, wheel speed pulses, positioning data, and redundant surroundings sensors.

In one embodiment, a lidar and/or a radar and/or a camera and/or an ultrasound sensor is or are used as redundant surroundings sensors.

According to one aspect of the present invention, a device for detecting a decalibration of at least one surroundings sensor for capturing the surroundings of a vehicle is proposed, the device comprising a data processing unit connected to the at least one surroundings sensor and configured for carrying out one of the above-described methods.

According to a further aspect of the present invention, a vehicle is proposed that comprises such a device and at least one surroundings sensor for capturing the surroundings of the vehicle.

In one embodiment, a lidar and/or a radar and/or a camera and/or an ultrasound sensor is or are provided as surroundings sensor.

In one embodiment, one or more sensors for capturing one or more items of data from the following list are provided for capturing the movement data of the vehicle: a steering angle, a yaw angle, a roll angle, a pitch angle, a yaw acceleration, a roll acceleration, a pitch acceleration, suspension travel signals, wheel speed pulses, positioning data, and redundant surroundings sensors.

In order to avoid degradation, the present invention proposes a direct comparison of the data of various sensors, in particular the available vehicle movement data and the detected sensor data. In normal operation, both data sources provide the same information about the orientation of the vehicle and the sensors redundantly, i.e., without misalignment between the two orientations. A change in the sensor orientation is manifested in an offset between the two data sources in terms of the extracted orientation. This change can be detected immediately, as soon as the input data are available for processing. The sensitivity is limited by the threshold values selected for the allowed offset.

Possible sensor data are inherent perception data (for example a point cloud of a lidar, radar echo, camera images, ultrasound echo) and data derived therefrom.

Possible vehicle data sources are:
the vehicle's own movement data:
steering angle,
yaw, roll and pitch angles incl. associated acceleration,
suspension travel signals,
wheel speed pulses,
positioning (GPS, GNSS, map data etc.),
redundant surroundings sensors (radar, camera, lidar, ultrasound).

BRIEF DESCRIPTION OF THE DRAWING FIGURES

Figure 2:
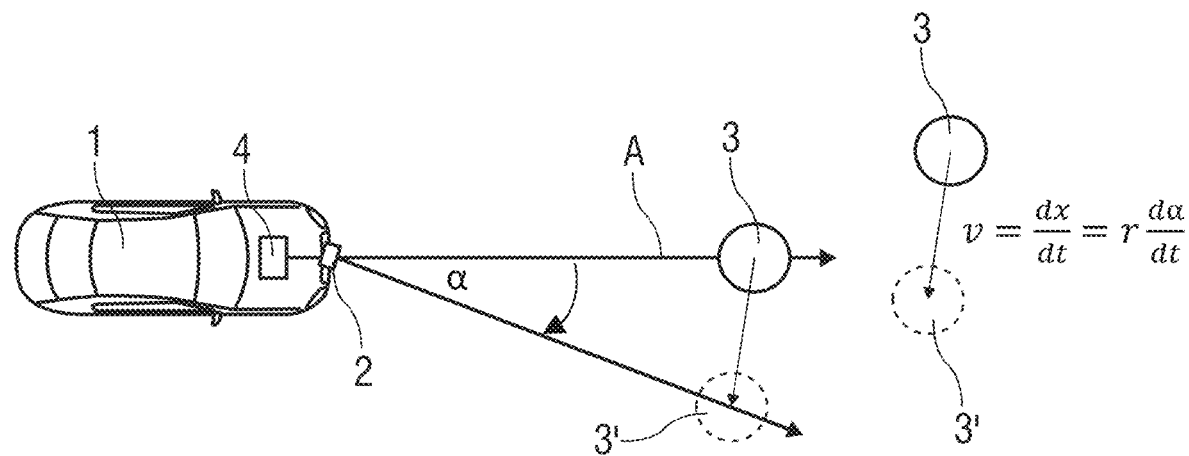
Figure 3:
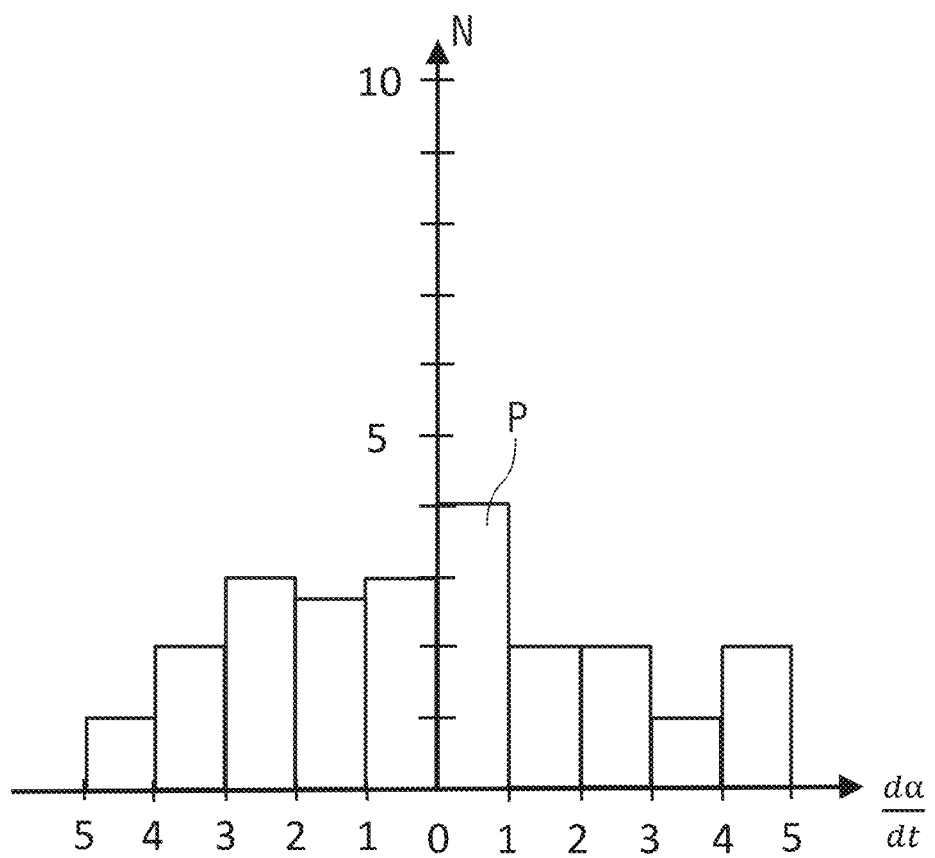
Figure 4:
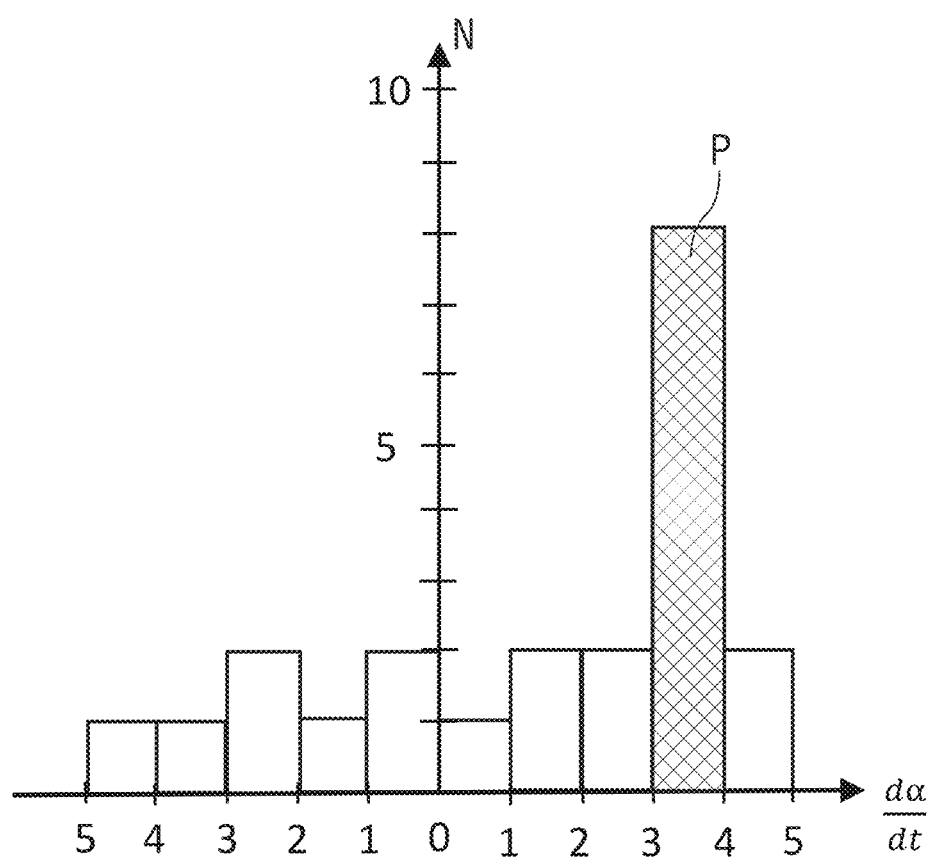

Exemplary embodiments of the invention are explained in detail hereinbelow with reference to the drawings, in which:

FIG. 1 shows a schematic view of a vehicle in normal operation,

FIG. 2 shows a schematic view of the vehicle in the event of a sudden change to the orientation of a surroundings sensor, FIG. 3 shows a schematic histogram for illustrating a distribution of a number of detected objects over different angular velocities in the normal operation of the vehicle, and FIG. 4 shows a schematic histogram for illustrating a distribution of a number of detected objects over different angular velocities in the event of a sudden change to the orientation of the surroundings sensor.

Mutually corresponding parts are provided with the same reference signs throughout all the figures.

DETAILED DESCRIPTION

FIG. 1 is a schematic view of a vehicle 1 in normal operation. At least one surroundings sensor 2 is arranged on the vehicle 1 that is oriented in the direction of or with respect to a vehicle axis A. The position of objects in the surroundings, which are detected by the surroundings sensor 2, is correct.

FIG. 2 is a schematic view of the vehicle 1 in the event of a sudden change in the orientation of the surroundings sensor 2. For example, the orientation of the surroundings sensor 2 deviates by an angle, in particular yaw angle, a from the vehicle axis A. Objects 3 therefore appear offset at an apparent position 3' as perceived by the surroundings sensor 2. In a reference frame, which moves along with the vehicle 1, changes in the position of the objects 3 are either a result of the object 3 itself or a result of the change in the orientation of the surroundings sensor 2. Sudden changes in the orientation appear to the surroundings sensor 2 as movement of the entire arrangement of objects 3 in the same direction. The displacement is r*α, where r is the radial distance from the respective object 3 to the surroundings sensor 2. All objects move at the same time with the same angular velocity dα/dt, in particular azimuth velocity. This movement of the entire arrangement can be detected by algorithmic filtering of the angular velocity dα/dt or the sensor position. The same analysis can be used for the pitch angle and the roll angle, so that sudden changes in the orientation can be detected for all possible scenarios.

FIG. 3 is a schematic histogram for illustrating a distribution of a number N of detected objects over different angular velocities dα/dt in the normal operation of the vehicle 1, i.e., if the surroundings sensor 2 is oriented correctly in the direction of or with respect to the vehicle axis A.

The angular velocity dα/dt is defined in the reference frame that moves along together with the vehicle 1. In normal operation, the distribution is wide and centered around zero in typical driving scenarios. The variance of the distribution is determined by the movement of the objects 3 around the vehicle 1.

FIG. 4 is a schematic histogram for illustrating a distribution of a number N of detected objects over different angular velocities dα/dt in the event of a sudden change in the orientation, i.e., if the surroundings sensor 2 is no longer correctly oriented in the direction of or with respect to the vehicle axis A. From the perspective of the surroundings sensor 2, a displacement in the orientation of the surroundings sensor 2 appears as movement of the entire surroundings of the vehicle 1 about the angle α. Consequently, all perception data exhibit a strong component of the angular velocities dα/dt that is superimposed on the real movement of the surroundings of the vehicle 1. This produces a peak P or a cluster P in the distribution that is not at zero. The magnitude of the angular displacement is greater, the faster the displacement has taken place. The detection of such a cluster P in the distribution of the angular velocities dα/dt represents an effective method for identifying a sudden change in the orientation of the surroundings sensor 2.

The angular velocities dα/dt of the detected objects 3 can be determined by comparing movement data of the vehicle 1 with data captured by the surroundings sensor 2 or derived therefrom. For example, a lidar and/or a radar and/or a camera and/or an ultrasound sensor can be used as surroundings sensor 2. One or more from the following list can be used as movement data of the vehicle 1: a steering angle, a yaw angle, a roll angle, a pitch angle, a yaw acceleration, a roll acceleration, a pitch acceleration, suspension travel signals, wheel speed pulses, positioning data and redundant surroundings sensors, for example a lidar and/or a radar and/or a camera and/or an ultrasound sensor.

The method can, for example, can carried out in a data processing unit 4 which can be arranged in the vehicle 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for detecting a decalibration of at least one surroundings sensor for capturing surroundings of a vehicle, the method comprising:
    detecting, by the at least one surroundings sensor, a plurality of objects in the surroundings;
    determining angular velocities of the detected objects while the vehicle is travelling;
    determining clusters of a number of the detected objects by a histogram evaluation based on the determined angular velocities; and identifying a decalibration of the surroundings sensor responsive to one of the determined clusters has an angular velocity other than zero, wherein the decalibration is caused by a deviation of an orientation of the surroundings sensor from a normal position relative to a vehicle axis of the vehicle.

2. The method of claim 1, wherein one or more of a yaw angle velocity, a pitch angle velocity, and a roll angle velocity are determined as angular velocity and are used as the basis for the histogram evaluation.

3. The method of claim 1, wherein the angular velocities of the detected objects are determined by comparing movement data of the vehicle with data captured by the surroundings sensor or derived from data captured by the surroundings sensor.

4. The method of claim 1, wherein the surroundings sensor is a lidar sensor, a radar sensor, a camera, or an ultrasound sensor.

5. The method of claim 4, wherein the movement data of the vehicle is one or more of a steering angle, a yaw angle, a roll angle, a pitch angle, a yaw acceleration, a roll acceleration, a pitch acceleration, suspension travel signals, wheel speed pulses, positioning data, and redundant surroundings sensor.

6. The method of claim 5, wherein a lidar sensor, a radar sensor, a camera, or an ultrasound sensor is used as a redundant surroundings sensor.

7. A device for detecting a decalibration of at least one surroundings sensor for capturing the surroundings of a vehicle, the device comprising:

a data processing unit is connected to the at least one surroundings sensor, wherein the data processing unit is configured to
   detect a plurality of objects in the surroundings;
   determine angular velocities of the detected objects while the vehicle is travelling;
   determine clusters of a number of the detected objects by a histogram evaluation based on the determined angular velocities; and
   identify a decalibration of the surroundings sensor responsive to one of the determined clusters has an angular velocity other than zero, wherein the decalibration is caused by a deviation of an orientation of the surroundings sensor from a normal position relative to a vehicle axis of the vehicle.

8. A vehicle, comprising:
the device of claim 7 and at least one surroundings sensor for capturing the surroundings of the vehicle.

9. The vehicle of claim 8, wherein the surroundings sensor is a lidar sensor, a radar sensor, a camera, or an ultrasound sensor.

10. The vehicle of claim 9, wherein the vehicle includes one or more sensors configured to capture one or more of the following items of data for capturing the movement data of the vehicle:
   a steering angle, a yaw angle, a roll angle, a pitch angle, a yaw acceleration, a roll acceleration, a pitch acceleration, suspension travel signals, wheel speed pulses, positioning data, and redundant surroundings sensors.

* * * * *